United States Patent [19]

McCray

[11] Patent Number: 5,662,150
[45] Date of Patent: Sep. 2, 1997

[54] METHOD OF DRILLING TRUE ELONGATED HOLES IN WOOD MEMBERS

[75] Inventor: Gerald R. McCray, Orange, Calif.

[73] Assignee: Phyllis J. McCray, Orange, Calif.

[21] Appl. No.: 589,856

[22] Filed: Jan. 22, 1996

[51] Int. Cl.⁶ .................. B27C 1/00; B27C 3/00
[52] U.S. Cl. .............. 144/365; 144/92; 144/144.51; 144/372; 408/72 B
[58] Field of Search ............. 144/92, 93.1, 144.51, 144/365, 372; 408/72 R, 72 B, 115

[56] References Cited

U.S. PATENT DOCUMENTS

| | | | |
|---|---|---|---|
| 4,153,384 | 5/1979 | Isaken | 144/92 |
| 4,294,567 | 10/1981 | Wiggins | 408/72 B |
| 4,474,514 | 10/1984 | Jensen | 408/72 B |
| 4,923,340 | 5/1990 | Hegedusch | 408/72 R |

*Primary Examiner*—W. Donald Bray
*Attorney, Agent, or Firm*—Harold L. Jackson

[57] ABSTRACT

A method of drilling elongated holes through wood beams having extra large depths to match the holes in structural hold down hardware by mounting a template over the beam with holes matching the holes in the hardware and using a drill press with multiple auger bits aligned with the template holes to drill the required holes through the beam.

8 Claims, 1 Drawing Sheet

U.S. Patent
Sep. 2, 1997
5,662,150
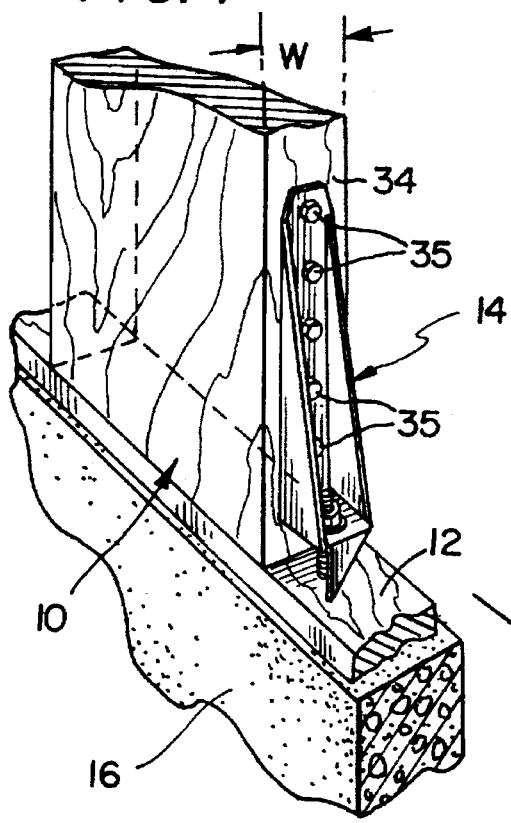
FIG. 1
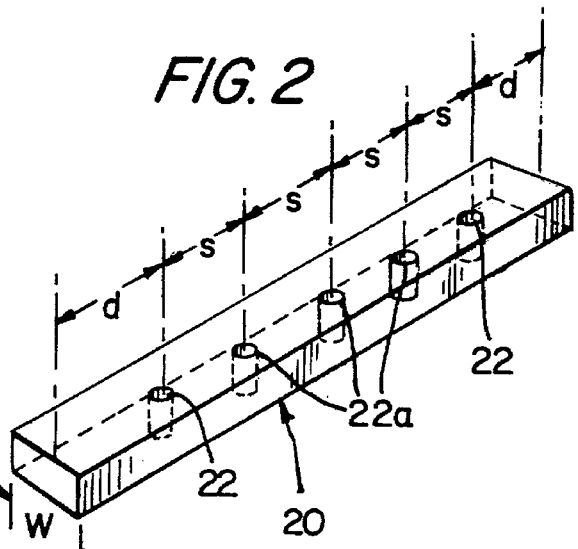
FIG. 2
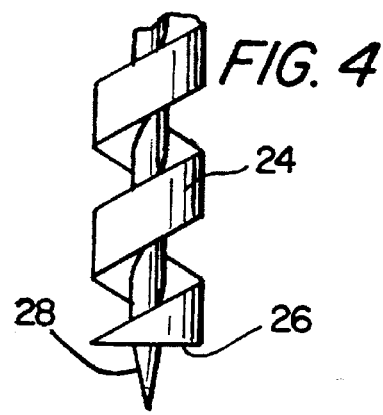
FIG. 4
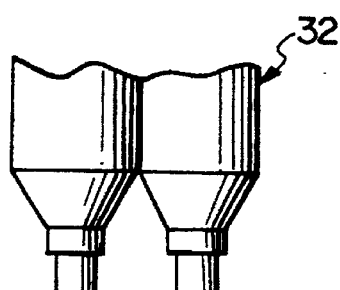
FIG. 3
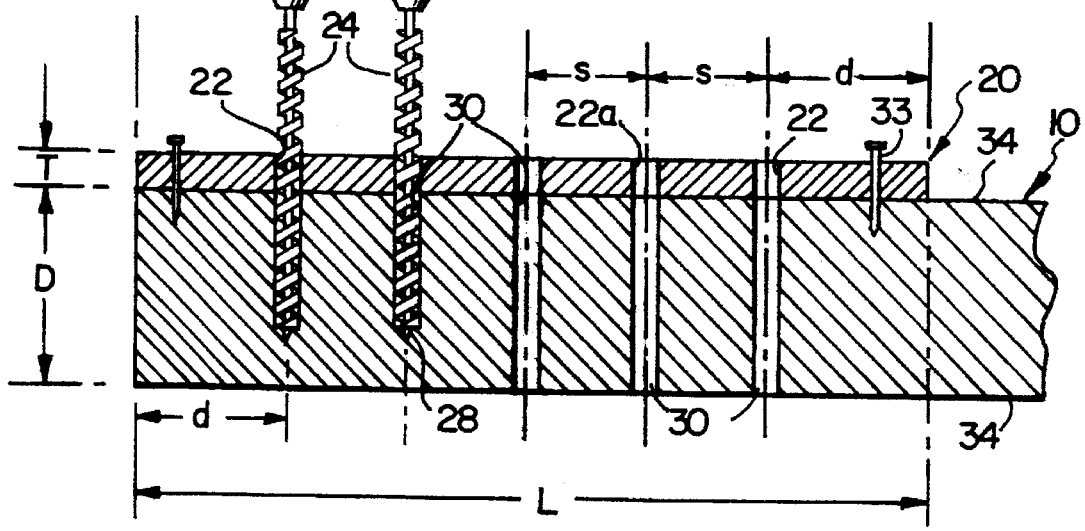

METHOD OF DRILLING TRUE ELONGATED HOLES IN WOOD MEMBERS

BACKGROUND OF THE INVENTION

The present invention relates generally to a method of mounting hold down hardware that is adapted to transfer tension loads between floors and concrete foundations. Such hold down hardware devices have become common to tie together wood-framed wall sections to concrete or masonry structures. The present invention is more particularly a method of drilling true elongated holes in wood support members for mounting hold down hardware used in the construction of various types of buildings. Such hold down devices are generally employed when a building is being built, since major construction projects incorporate wood framed sheer walls or the like that must satisfy stringent load bearing specifications.

The method of the present invention is more particularly useful in areas where earthquakes are prevalent. Retrofitting of old buildings must comply with seismic requirements that are now required in several states. This is particularly true with respect to earthquake damaged buildings that must comply with new retrofit code requirements d&fined by federal, state or county agencies.

Retrofitting is a very tedious and time consuming job and thus is an expensive operation. However, the present invention indicates that a substantial amount of savings in the cost of retrofitting can be realized because of the innovative method of mounting the hold down hardware members.

The major time consuming operation in the art of retrofitting structures occurs when hold down hardware is required to be mounted to a vertical, load bearing, structural member or beam that must be inserted in or together with a wall wood frame structure.

Commonly, vertical bearing members, generally referred to as studs, are used in sizes such as 2×4's, 2×6's, 2×8's and some even wider such as 4×6's, 4×8's, etc. However, to better understand the problem when retrofitting, load bearing beams are very often defined as elongated boards that often exceed the usual dimensions as noted above. Therefore, it is common to find that load bearing beams can be formed in various sizes of approximately 3~ inches or more in width and 30 inches or more in depth, requiring the drilling of a plurality of very straight aligned bores or holes in the beams to receive respective elongated bolts which are readily inserted so as to extend from one side to the other of the beam without binding.

Until the present method, as described herein, large board members were bored by first drilling from one side of the board and then drilling from the opposite side in hopes that the two oppositely disposed bores would be aligned with one another so as to define a fast true hole or bore to receive the corresponding elongated bolt. To allow each bolt to readily passed through its respective bores, it must be positioned to correspond to the aligned, equally spaced holes located in a given hold down member. Thus, the bolt receiving bores are required to be in perfect parallel alignment with each other.

SUMMARY OF THE INVENTION

Accordingly, the present invention has for an important object to provide a novel method of drilling elongated holes through wood beams that are formed having extra large depths, whereby the bores are drilled in a straight parallel arrangement to correspond to the holes that are preformed on a hold down hardware member that is to be secured to a wood beam.

Another object of the invention is to provide a novel method of forming a plurality of elongated holes or bores through a wood beam or stud that is formed with an extra large depth. The holes are drilled by means of an elongated auger bit which is provided with a length that is at least greater than the depth of the wood beam so that the drill bit drills the hole straight and true through the full depth of the beam.

Still another object of the present invention is to provide a method of this character, wherein a drilling template is employed to guide the extra long auger bit during the drilling operation. The template is defined by an elongated member of wood or other suitable material formed having a plurality of holes positioned centrally along its length that has a thickness suitable to receive a large portion of the cutting end of the auger which includes a pointed guide pin to control the direction of the rotating cutting edge. The auger is attached at its stem end to a suitable drill press machine and is positioned in a hole of the template that is first removably secured to one side of the wood beam that defines its width.

It is still another object of the present invention to provide a template having a plurality of aligned guide holes that are arranged to duplicate the aligned holes of the hold down member which is to be affixed to the respective beam and is to be employed in mounting the beam.

A further object of the invention is to provide a method of this character wherein a plurality of auger bits, preferably at least two side-by-side bits are used to simultaneously drill a corresponding number of bores or holes, whereby the holes are aligned in parallel relation to each other, thereby providing an accurately aligned group of holes to be formed in the beam. Once the number of bored holes are drilled the template can then be removed and the corresponding hold down hardware can be mounted by means of bolts.

A still further object of the present invention is to provide a method that includes drilling means that saves a substantial amount of time in labor, thereby substantially reducing the cost of drilling a plurality of bore holes in a wood beam for installing the hold down hardware. The present method as herein described reduces the typical cost for drilling a hole from approximately $6.00 a hole to approximately $.50 cents a hole.

Thus, it will be readily understood from the following description of the present invention that the known problems of the complicated and time consuming procedures for drilling extra long holes in wood beams have been overcome by employing elongated auger bits that are specifically provided with smooth pointed tips together with a template guide that conforms to the corresponding hole configuration of hold down hardware that is to be mounted on the beam.

BRIEF DESCRIPTION OF THE DRAWINGS

Novel features and advantages of the present invention in addition to those mentioned above will become apparent to those skilled in the art from reading the following detailed description in conjunction with the accompanying drawings wherein:

FIG. 1 is a pictorial view to a vertical support beam fixedly secured to a foundation by a hold down hardware device that was installed by the method of the present invention;

FIG. 2 is a perspective view of a template as used in the new method of mounting hold down hardware to a wood beam or stud;

FIG. 3 is an elevational view showing a drill press and a pair of auger bits drilling aligned holes in a beam while being guided by the template; and FIG. 4 is a view of an auger bit formed with a guide tip.

DESCRIPTION OF THE PREFERRED EMBODIMENT

Referring now to the drawing figures and more particularly to FIG. 1, there is shown a pictorial view of a load support beam or stud, generally indicated at 10, that is mounted on a sill member 12 and fixedly secured by means of a hold down hardware member, indicated at 14, to a structural foundation 16. In this view only one hold down member 14 is illustrated. However, it should be understood that a second hold down member can be mounted to the opposite side of the vertical beam 10, when required. It should also be recognized that the present method, as presented herein, is compatible with various hold down and other hardware devices that are presently known in the art. There are several structural connection points in a building that often require shoring to establish a continuous load transfer path from the rafters to the foundation of the building structure. Two of the most typical connecting points wherein hold down members are used are in floor-to-floor connections, and foundation connections, as illustrated in FIG. 1.

Accordingly, once the connection point is known then the size of the proper load bearing beam is determined, as indicated at 10, in FIGS. 1 and 2. The load bearing beam can be of any size as would be required. The width of the beam, indicated at "W", is defined by its oppositely disposed flat edges 34 and may be formed having a dimension of between 3- inches to 6 inches or more, with a depth "D" of between 10 inches to more than 30 inches. Accordingly, it is the length of the bores 30 that must be drilled through the depth "D" that presents the problem. These extended bores are commonly drilled by boring first from one side and than boring from the opposite side of the beam. To properly align the two oppositely drilled bores so as to define a single bore becomes a very difficult and time consuming task.

In order to use the present method a template, generally indicated at 20, is provided and is formed from a suitable material such as plastic or preferably a hard wood having a sufficient thickness "T" to act as a guide means for the aligned auger bit or bits 22, as illustrated in FIG. 3. The width "W" of the template 20 should match the width of sill 12 and/or the width of beam 10. A plurality of guide holes 24 are formed in the template so as to match a particular hole configuration for a given hold down member 14. Each template 20 is formed having a length "L" that corresponds to the hold down hardware and is adapted to be temporarily mounted to the end of the beam 10. The distance from the surface of sill 12 to the first hole of the hold down hardware member is critical. Therefore, distance "d" from the end of the template and leading hole 22, indicated at each end of the template, must be the same. (See FIG. 2). The space "S" between each of the template holes 22 and 22a must match that of each spaced hole provided in the hold down device.

The second most important factor of the present invention is the step of providing an auger bit 24, wherein the wood engaging end 26 is formed with a drill bit guide means 28 that is defined as a smooth surface conical pin that controls the centering of the auger bit as it rotates in forming the elongated bores 30. It has been found that conventional auger bits, which are provided with screw threads at the drilling end, are unsatisfactory because the screw threads tend to pull the auger bit into the work piece thereby causing a misalignment of the drilled hole. An auger bit with a smooth conical pin works best because it does not compete with the pushing action of the drilling apparatus.

Drilling is provided by at least one drilling apparatus, such as a drill press, indicated generally at 32, that is preferably adapted to drill more than one hole at a time. Accordingly, the drilling apparatus, illustrated in FIG. 3, is shown having a pair of auger bits 24 drilling two juxtaposed parallel bores 30. The template together with the conical pin 28 prevents wobbling of the auger bits during rotation. The auger bits require a length greater than the thickness "T" of the template plus the depth "D" of the beam 10. The guide holes 22 and 22a in the template 20 are formed having a diameter slightly greater than the diameter of the auger bit 24 to allow the auger to pass through holes 22 without causing damage to the template. The template is removably affixed over the drilling area of the beam by a suitable attaching means such as a nail or the like, as indicated at 33 in FIG. 3.

As an example, the following steps would be taken in drilling a beam having a 30-inch depth "D":

Positioning beam 10 on one of its edges 34 and on a suitable flat support table (not shown), positioning the template 20 over the upper free edge portion of the beam where the drilling has been determined, and aligning the template on the exact location to which the hold down hardware member will be secured by bolts 35. Fixedly securing the template in a place by suitable attaching means 32. The drilling means is then aligned with a first group of holes 22 and 22a of template 20 so that auger bits 24 will freely pass through holes 22 and 22a and engage the beam, thereby reaming the respective bores 30 in a perfect straight line from one side to the other. The bits 24 have a diameter slightly greater than the diameter of the bolts 35 that are to be employed for securing the hardware to a given structure. After the bores 30 of drilled the hardware 14 mounted to the beam by means of bolts 35, whereby the beam is now ready for installation as part of the structural frame-work of a building, as shown in FIG. 1.

It should be understood that modification of the disclosed method will become obvious to those skilled in the art without any departure from the spirit and scope of my invention as set forth in the appended claims. In this regard, my novel method may be used to drill multiple holes in one or more wood members for use in mounting hardware of various types to the drilled wood members on a mass production basis. The term hold down hardware as used in the appended claims shall include such mounting hardware.

What is claimed is:

1. A method of drilling a plurality of elongated bores in a wood beam for mounting at least one hold down member having holes selectively arranged therein, comprising the steps of:

positioning a wood beam along one longitudinal edge thereof on a flat plane, whereby the opposite free edge thereof is position upwardly therefrom to receive one or more drill bits;

mounting a template along the free edge of said wood beam at the location where the hold down member is to be fixedly secured, and wherein said template has drill bit guide means formed therein;

positioning said template on said free edge, whereby said drill bit guide means are located in a corresponding position to match the holes formed in said hold down member;

providing a drilling means having at least one auger style drill bit the drill bit having a smooth conical pin at the leading end thereof;

aligning said drill bit so as to be received in said guide means of said template; and drilling a plurality of bores through said drill bit guide template wherein each of said bores is drilled the full depth of said wood beam.

2. A method of drilling a plurality of elongated bores in a wood beam as recited in claim 1, wherein the drilling means comprises a drill press and the guide means is defined by a plurality of holes formed in said template to match the holes formed in the hold down member.

3. A method of drilling a plurality of elongated bores in a wood beam as recited in claim 2, wherein said template is formed having a given thickness so that each of said holes in said template defines a bit guide means.

4. A method of drilling a plurality of elongated bores in a wood beam as recited in claim 3, wherein said wood beam is formed having a given width and a given depth, and wherein said width of said template is equal to the width of said wood beam.

5. A method of drilling a plurality of elongated bore in a wood beam as recited in claim 4, wherein at least two drill bits are rotatably mounted in said drilling means.

6. A method of drilling a plurality of elongated bores in a wood beam as recited in claim 5, wherein said drill bits are defined as auger bits formed having a guide means at the drilling ends thereof.

7. A method of drilling a plurality of elongated bores in a wood beam for mounting at least one hold down member having holes selectively arranged therein, comprising the steps of:

positioning a wood beam along one longitudinal edge thereof on a flat plane, whereby the opposite free edge thereof is positioned upwardly therefrom to receive one or more drill bits;

mounting a template along the free edge of said wood beam at the location where the hold down member is to be fixedly secured, and wherein said template has drill bit guide means in the form of a plurality of holes formed therein;

positioning said template on said free edge, whereby the holes in said drill bit guide means are located in a corresponding position to match the holes formed in said hold down member;

providing a drilling means having at least two auger drill bits having a smooth conical pin at the drilling end thereof;

aligning said drill bits so as to be received in at least two of said holes in the template; and drilling simultaneously at least two bores through said at least two holes in the template and through the wood beam, wherein each of said bores is drilled the full depth of said wood beam.

8. A method of drilling a plurality of elongated bores through the depth of a wooden beam for mounting at least one hold down member having holes selectively arranged therein, comprising the steps of:

positioning a wooden beam along one longitudinal edge thereof on a flat plane, whereby the opposite free edge thereof is positioned upwardly therefrom to receive one or more drill bits;

providing a drill press having a vertical movement sufficient for the depth of the beam to be drilled;

providing an auger drill bit having a smooth conical pin at the drilling end thereof;

securing the drill bit in the drill press;

mounting a template along the free edge of said wooden beam at the location where the hold down member is to be fixedly secured, and wherein said template has drill bit guide means in the form of a plurality of holes formed therein;

positioning said template on said free edge, whereby the holes in said drill bit guide means are located in a corresponding position to match the holes formed in said hold down member;

aligning the drill bit so as to be received in one of said holes in the template; and drilling a plurality of bores through the template and through the wooden beam, wherein each of said bores is drilled the full depth of said wooden beam.

* * * * *